US008763426B2

(12) United States Patent
Rotstein et al.

(10) Patent No.: US 8,763,426 B2
(45) Date of Patent: Jul. 1, 2014

(54) COOLING CRYSTALLIZER

(75) Inventors: Yeshayahu Rotstein, Kfar Saba (IL); Tuvia Zisner, Ra'Anana (IL); Joseph Weinberg, Netanaya (IL); Avraham Ophir, Herzliya (IL)

(73) Assignee: I.D.E. Technologies Ltd., Kadima (IL)

( * ) Notice: Subject to any disclaimer, the term of this patent is extended or adjusted under 35 U.S.C. 154(b) by 350 days.

(21) Appl. No.: 13/145,560

(22) PCT Filed: Dec. 10, 2009

(86) PCT No.: PCT/IL2009/001174
§ 371 (c)(1),
(2), (4) Date: Jul. 20, 2011

(87) PCT Pub. No.: WO2010/084484
PCT Pub. Date: Jul. 29, 2010

(65) Prior Publication Data
US 2011/0271712 A1    Nov. 10, 2011

(30) Foreign Application Priority Data

Jan. 22, 2009    (IL) .......................................... 196658

(51) Int. Cl.
*B01D 9/02*    (2006.01)
(52) U.S. Cl.
USPC .............................. 62/535; 159/45; 23/295 R
(58) Field of Classification Search
USPC ............ 23/295 R–304 R; 423/159, 188, 195; 62/535
See application file for complete search history.

(56) References Cited

U.S. PATENT DOCUMENTS 1,944,548 A    1/1934    Ebner
3,167,401 A    1/1965    Elkan

FOREIGN PATENT DOCUMENTS

| DE | 570360 | 2/1933 |
| DE | 598442 | 6/1934 |
| EP | 1867373 A1 | * 12/2007 |
| GB | 958596 | 5/1964 |

OTHER PUBLICATIONS

Heist, James A. Freeze Crystallization: Improving the Energy Efficiency of a Low-Energy Separation Process. Proceedings from the Third Industrial Energy Technology Conference Houston, TX. (Apr. 26-29, 1981).*
International Search Report from the ISA for PCT/IL2009/001174.
Written Opinion from the ISA for PCT/IL2009/001174.
International Preliminary Report on Patentability (IPRP) from the IPEA for PCT/IL2009/001174.

* cited by examiner

*Primary Examiner* — Allen Flanigan
*Assistant Examiner* — Johan Yavari
(74) *Attorney, Agent, or Firm* — Graeser Associates International Inc; Dvorah Graeser

(57) ABSTRACT

A system and method for separating at least a part of the solids from brine having an initial temperature T1, the system comprising a crystallizer comprising a crystallizer inlet for receiving therein said brine, a crystallizer first outlet for discharging vapor having a first pressure P1, evaporated from at least a part of said brine, and a crystallizer second outlet for discharging a slurry having a final temperature T2 lower than said initial temperature T1; a separator comprising a separator inlet for receiving therein said slurry, a separator first outlet for discharging therefrom said part of the solids separated from said slurry, and a separator second outlet for discharging therefrom a remaining liquid having a temperature substantially equal to T2; a compressor comprising a compressor inlet for receiving therein said vapor, and a compressor outlet for discharging therefrom a compressed vapor having a second pressure P2 higher than said pressure P1; and a condenser comprising a condenser first inlet for receiving therein said compressed vapor, a condenser second inlet for receiving therein said remaining liquid discharged from said separator, for absorbing a latent heat released from said compressed vapor, condensing thereby said compressed vapor, and a condenser outlet for discharging therefrom an outlet liquid having a temperature substantially equal to T1.

8 Claims, 2 Drawing Sheets

COOLING CRYSTALLIZER

FIELD OF THE INVENTION

This invention relates to a system for producing solids from brine, in particular by using vapor compression cooling.

BACKGROUND OF THE INVENTION

The production of commercially valuable salts and minerals, from their naturally occurring solutions (brines) by solar evaporation has been practiced for millennia around the world. The commonest example for the use of solar evaporation is the production of common salt (NaCl) from seawater: the seawater is fed into large, shallow ponds and water is removed through natural evaporation which allows the salt to precipitate and subsequently be harvested. Another, more recent example is the production of potassium salts from minerals crystallized by solar evaporation around, for example, the Dead Sea.

Solar evaporation in shallow ponds, which is sometimes combined with winter-cooling in the ponds, is very economical, but it requires the availability of large, flat surfaces possessing impervious soil in addition to the appropriate climatic conditions: dry and hot weather at least part of the year and scarcity of precipitation (rain etc.) throughout the year. In the absence of these conditions, the use of combustible fuels (e.g. peat, wood etc.) has been practiced, but this resource is wasteful, expensive and not easily renewable.

In the Dead Sea operations, carnallite ($KClMgCl_2$ $6.(H_2O)$) is produced in solar ponds from Dead sea water. The mother liquor remaining in the ponds after the precipitated carnallite has been harvested is referred to as End Brine (EB). EB is a saturated solution of the minerals of the Dead Sea, and therefore is relatively highly concentrated. The actual concentration of the EB (or Mother Liquor) will depend on the type of the raw water source and will be usually in the range of 22% to 35%. The EB contains valuable minerals which, however, cannot be further extracted by the usual practice of solar evaporation, due to the low vapor pressure of the brine.

SUMMARY OF THE INVENTION

In accordance with one aspect of the present invention, there is provided system for separating at least a part of the solutes from brine having an initial temperature $T_1$. The system comprises:
- a crystallizer comprising a crystallizer inlet for receiving therein the brine, a crystallizer first outlet for discharging vapor having a first pressure $P_1$, evaporated from at least a part of the brine, and a crystallizer second outlet for discharging a slurry having a final temperature $T_2$ lower than the initial temperature $T_1$;
- a separator comprising a separator inlet for receiving therein the slurry, a separator first outlet for discharging therefrom the part of the solids separated from the slurry, and a separator second outlet for discharging therefrom a remaining liquid having a temperature substantially equal to $T_2$;
- a compressor comprising a compressor inlet for receiving therein the vapor, and a compressor outlet for discharging therefrom a compressed vapor having a second pressure $P_2$ higher than the pressure $P_1$; and
- a condenser comprising a condenser first inlet for receiving therein the compressed vapor, a condenser second inlet for receiving therein the remaining liquid discharged from the separator, for absorbing a latent heat released from the compressed vapor, condensing thereby the compressed vapor, and a condenser outlet for discharging therefrom an outlet liquid having a temperature substantially equal to $T_1$.

Each crystallizer may comprise a plurality of crystallizer units arranged in series between the crystallizer inlet and the crystallizer second outlet. Each crystallizer unit may be adapted to lower the temperature of the brine received therewith by a temperature difference $\Delta T$ Each but first crystallizer unit may be adapted to receive therein a brine of a temperature lower than that received within the preceding crystallizer unit and to discharge therefrom a vapor of a pressure lower than that discharged from the preceding crystallizer unit. Optionally, one or more crystallizer units may comprise a plurality of individual crystallizers arranged in parallel.

The compressor may comprise a plurality of compressor units. One or more compressor units may comprise a plurality of individual compressors arranged in parallel, each compressor unit being in fluid communication with its corresponding crystallizer unit.

Each condenser may comprise a plurality of condenser units arranged in series However each condenser unit may comprise a plurality of individual condensers arranged in series between the condenser first inlet and condenser outlet, each condenser being in fluid communication with its corresponding compressor unit, each condenser unit being adapted to raise the temperature of the liquid received therewith by the temperature difference $\Delta T$, each but last condenser unit being adapted to receive therein a liquid of a temperature higher than that received within the preceding condenser unit and a compressed vapor of a pressure higher than that received within the preceding condenser unit, the compressed vapor being discharged from the corresponding compressor unit. The condenser size is determined to suit the corresponding compressor and crystallizer units.

The temperature difference may be the same in all the plurality of crystallizer units, or, alternatively, may vary between the plurality of crystallizer units.

A compression pressure ratio between a pressure of the compressed vapor discharged from each compressor unit and the pressure of a vapor received within each compressor unit may be substantially equal in the plurality of compressor units.

The system may comprise means allowing to create and maintain vacuum in the system.

The system may comprise means allowing the addition of secondary soluble solids to said condenser to reduce the compression pressure ratio $P_2/P_1$ required relative to its value without the addition.

In accordance with another aspect of the present invention there is provided a method of separation of at least part of the solids from brine having an initial temperature $T_1$, the method comprising:
- evaporating at least a part of the brine producing thereby a vapor stream having a first pressure $P_1$ and a slurry having a second temperature $T_2$ lower than the first temperature $T_1$;
- separating the part of the solids from the slurry, producing thereby a remaining liquid having a temperature substantially equal to $T_2$;
- compressing the vapor thereby increasing its pressure from $P_1$ to $P_2$;
- condensing the compressed vapor by having the remaining liquid absorb a latent heat released from the compressed vapor and discharging an outlet liquid of temperature substantially equal to $T_1$.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
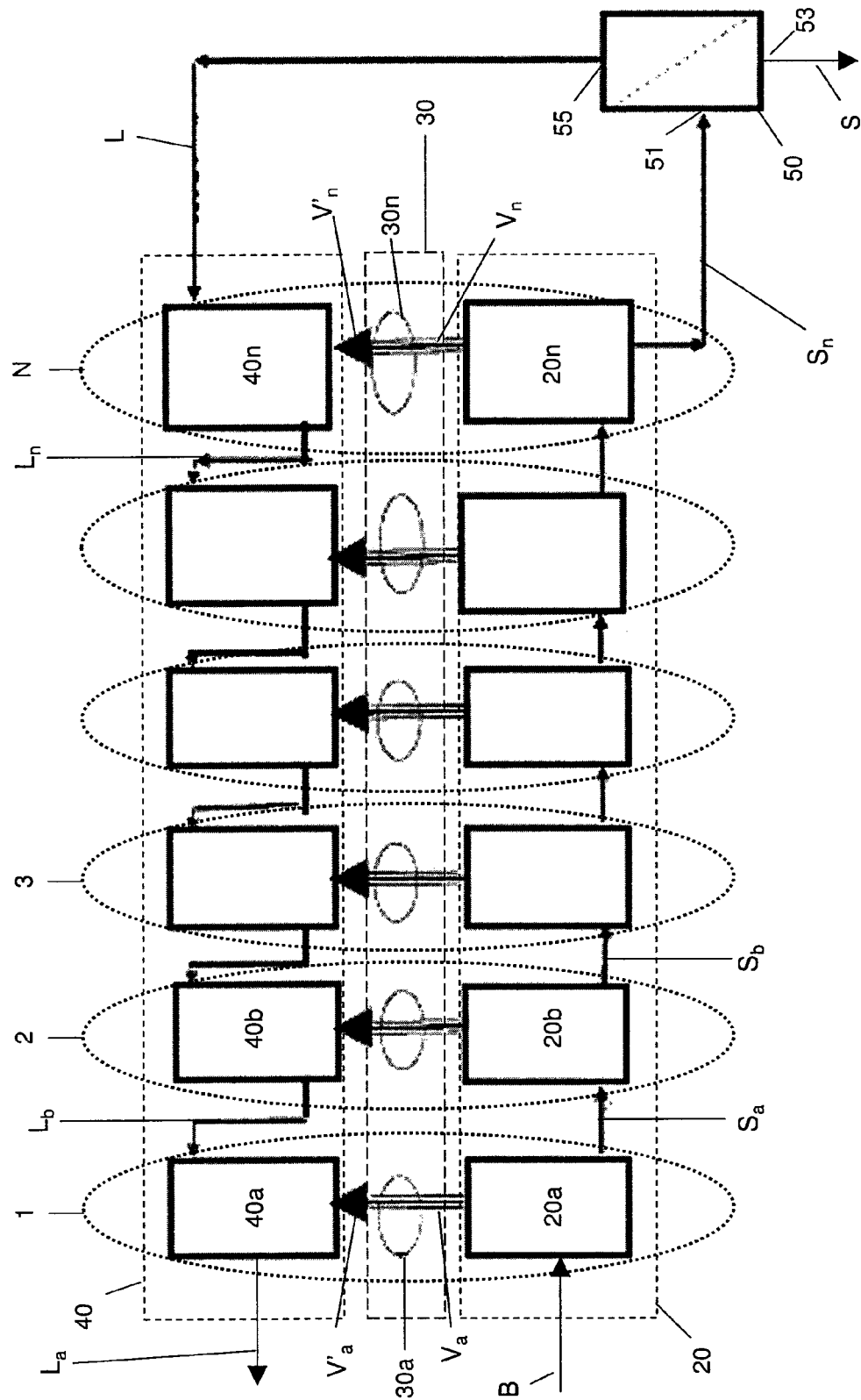
FIG. 1 is a schematic illustration of a system according to the present invention.
Figure 2:
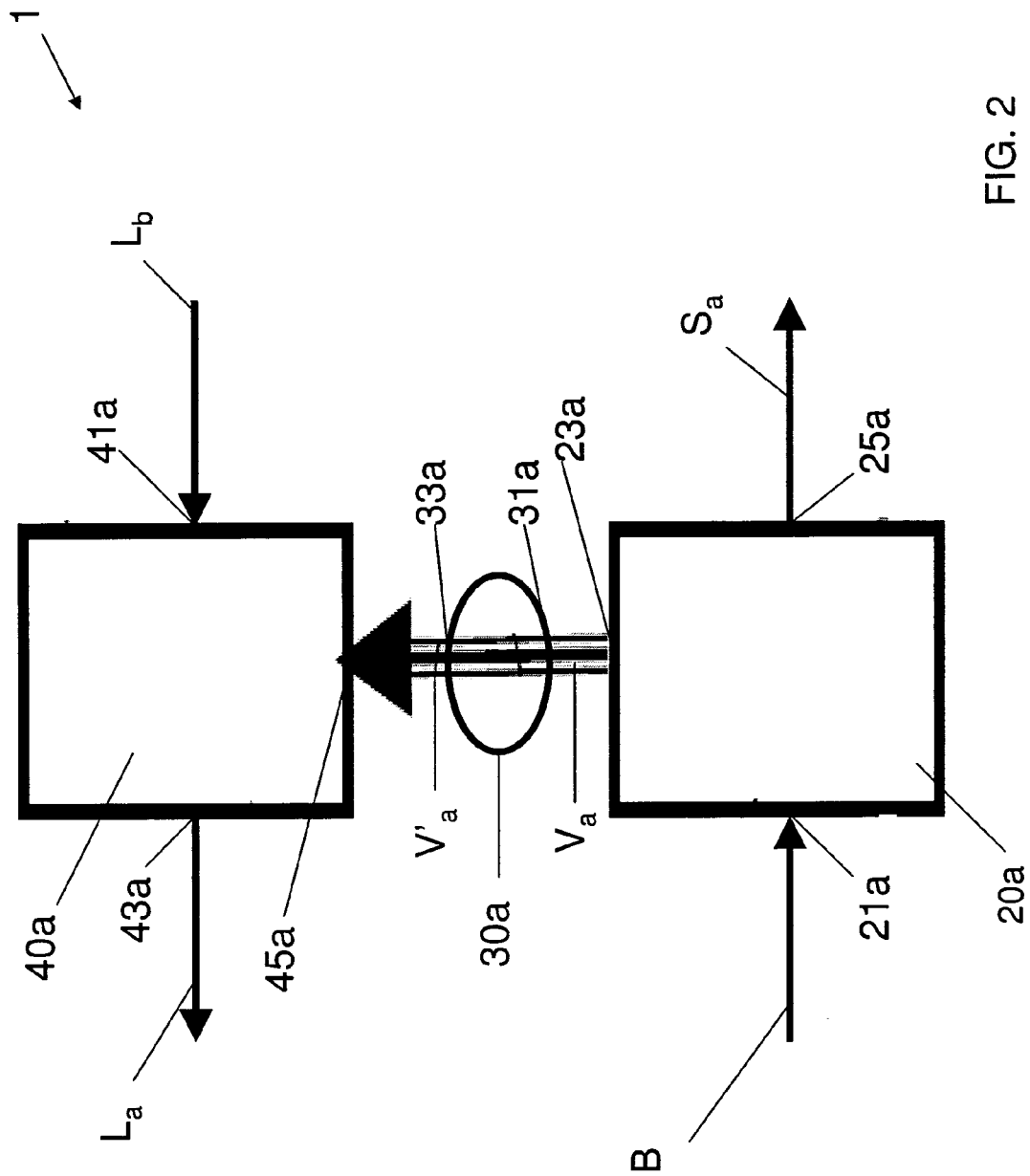
FIG. 2 is a schematic illustration of the first stage of the system shown in FIG. 1.

FIGS. 1 and 2 show a system 10 for separating at least part of the solids from a source brine B. The system 10 comprises four main sub-systems, namely, a crystallizer sub-system 20, a compressor sub-system 30, a condenser sub-system 40 and a separator sub-system 50.

The crystallizer sub-system 20 comprises a succession of N crystallizer units 20a, 20b ... to 20n, arranged in series, so that each of the crystallizer units 20a to 20n is in fluid communication with the crystallizer units adjacent thereto. The first unit 20a comprises a source inlet 21a for receiving therein the source brine B, a first vapor outlet 23a for discharging therefrom a first water vapor stream $V_a$ and a first slurry outlet 25a for discharging therefrom a first slurry stream $S_a$. The units 20b to 20n comprise slurry inlets 21b to 21n for receiving therein slurries $S_a$ to $S_{n-1}$, respectively, vapor outlets 23b to 23n for discharging therefrom water vapors $V_b$ to $V_n$, respectively, and slurry outlets 25b to 25n for discharging therefrom slurries $S_b$ to $S_n$ respectively.

Each crystallizer unit 20a to 20n is adapted to reduce the temperature of the slurry solution received therein by a temperature drop ΔT, which may be fixed and, in particular, may amount to about several degrees. However, the system 10 may be designed so that each crystallizer unit will apply a different temperature gradient to the solution received therein, in which case, they will have temperature drops $\Delta T_a$ to $\Delta T_n$.

The crystallizer units 20a to 20n are adapted to maintain a constant pressure $P_{1a}$ to $P_{1n}$, respectively, therein, which is determined by the pressure of the vapors $V_a$ to $V_n$ within the units 20a to 20n. Due to the temperature reduction of the slurry from unit to unit, the pressure of the vapor gradually decreases along the crystallizer units 20a to 20n, so that the pressure $P_{1a}$ within the first unit 20a is the highest and the pressure $P_{1n}$ of the last unit 20n is the lowest.

The separator sub-system 50 comprises a slurry inlet 51 in fluid communication with the last crystallizer unit 20n for receiving therein the slurry $S_n$ discharged therefrom. The separator 50 further comprises a solids outlet 53 for discharging therefrom a certain amount of solids separated from the slurry $S_n$ and a liquid outlet 55 for discharging therefrom a remaining liquid L.

The compressor sub-system 30 comprises N compressor units 30a to 30n and vapor inlets 31a to 31n for receiving therein water vapors $V_a$ to $V_n$, discharged from the vapor outlets 23a to 23n of the crystallizer units 20a to 20n, respectively. The compressor units 30a to 30n further comprise compressed vapor outlets 33a to 33n, for discharging therefrom compressed vapor streams $V'_a$ to $V'_n$, respectively.

Each compressor unit 30a to 30n is designed to operate at the specific working conditions dictated by the different conditions, such as temperature and pressure, prevailing in each effect. The compressors units are further designed to receive relatively high volumetric flow rates of vapor. For example, the compressor units may be of the kind capable of receiving flow rates higher than 100 m³/s, and more particularly in the range of 150-320 m³/s.

In this connection, the compressor units 30a to 30n may be of the kind described in the Applicant's patent application WO/2006/090387, contents of which are incorporated herewith by reference.

The compressor units 30a to 30n are adapted to compress vapor received therewithin, with relatively low compression pressure ratio R (which may be either identical or vary between the compressor units). For example, the compression ratio may be lower than 2, and more particularly in the range of 1.3<R<1.5.

The condenser sub-system 40 comprises N condenser units 40a to 40n arranged in series, so that each of the condenser units 40a to 40n is in fluid communication with the condenser units adjacent thereto and the last unit 40a is also in fluid communication with the separator unit 50. The condenser units 40a to 40n comprise liquid inlets 41a to 41n for receiving therein liquids $L_b$ to L, liquid outlets 43a to 43n for discharging therefrom liquids $L_a$ to $L_n$ and vapor inlets 45a to 45n for receiving therein compressed vapors $V'_a$ to $V'_n$ discharged from the compressor units 30a to 30n, respectively.

Each condenser unit 40a to 40n is adapted to raise the temperature of the liquid solution received therein by several degrees ΔT, in correspondence with the temperature drop ΔT provided by each crystallizer unit 20a to 20n. Similarly to the temperature drops of the crystallizer units 20a to 20n, each condenser unit may apply a different temperature rise to the solution received therein. This difference, however, has to be practically equal to that of the corresponding crystallizer unit.

Each of the condenser units 40a to 40n is adapted to maintain a respective constant pressure $P_{2a}$ to $P_{2n}$, therein. The pressure is determined by the pressure of the vapor $V'_a$ to $V'_n$ within the units 40a to 40n and gradually increases along the line of condenser units 40n to 40a, so that the pressure $P_{2n}$ of the last unit 40n is the lowest and the pressure $P_{2a}$ within the first unit 40a is the highest, this being due to the temperature rise of the liquid from condenser unit to the next one.

Thus, the system 10 is, in fact, a multi-stage system comprising N stages 1 to N (excluding the separator unit, being an independent separate entity), arranged so that each stage comprises three units, namely, one crystallizer unit, one compressor unit and one condenser unit. For example, the first stage comprises the first crystallizer unit 20a, the first compressor unit 30a and the first condenser unit 40a. In this connection, each stage may comprise more than one unit of crystallizers, compressors or condensers.

The system 10 further comprises means for creating and maintaining a vacuum within the crystallizer 20, the compressor 30, and the condenser 40 sub-systems. In particular, the system 10 may comprise external vacuum pumps (not shown) of any suitable kind, for continuous removal of air and non-condensable gases from the system.

The system 10 may further comprise means for the addition of secondary soluble solids to all or some of the condenser units 40a to 40n. The addition of these solids raises the concentration of the solution in the condenser unit (and its boiling point elevation), thus lowering thereby the vapor pressure within the unit. Lowered vapor pressure decreases the required compression work that the corresponding compressor unit has to provide.

In operation, the source brine B, having a solutes concentration $C_1$ and a temperature $T_1$, is introduced into the source inlet 21a of the first crystallizer unit 20a. Within this unit, the solution is cooled to a temperature $T_{1a}$, some of the solutes content of the brine B precipitates and the slurry $S_a$ is discharged therefrom, as will be further explained. The vapor $V_a$ evolved during cooling and having a pressure $P_{1a}$ is discharged through the vapor outlet 23a and enters the first compressor unit 30a. Within the compressor unit 30a this vapor $V_a$ is compressed to $V'_a$ having a pressure $P_{2a}$ which is determined by the compression pressure ratio R of the unit 30a satisfying the condition: $P_{2a}=P_{1a}\cdot R$. The compressed vapor $V'_a$ enters the vapor inlet 45a of the condenser unit 40a. In this condenser unit, during the condensation (absorption) of the compressed vapor $V'_a$, its latent heat is released into liquid $L_b$, raising its temperature $T_{2a}$ to a value substantially equal or slightly higher temperature $T_1$.

Referring back to the slurry $S_a$, it is released from the first crystallizer unit 20a at temperature $T_{1a}$ and a total salt concentration $C_{1a}$ higher than concentration $C_1$ of the brine B. The slurry $S_a$ then enters the adjacent crystallizer unit 20b. The slurry $S_n$, released from the last crystallizer unit 20n, is of a temperature $T_{1n}$ significantly lower than the temperature $T_1$ of brine B fed into the first crystallizer unit 20a. This temperature difference is achieved by the gradual temperature reduction of the slurry flowing along the crystallizer units cascade 20a to 20n. The lower limit of the temperature $T_{1n}$ is defined by the BPE of the slurry solution and determined by the need to prevent the water vapor from reaching the pressure corresponding to the freezing point of pure water. The temperature $T_{1n}$ allows at least a part of the solutes to precipitate so as to be further separated by the separator sub-system 50.

The description similar to the above applies to each of the stages 2 to N of the system 10, where the process takes place within the corresponding crystallizer, compressor and condenser units.

The slurry $S_n$, released from the last crystallizer unit 20n enters the slurry inlet 51 of the separator unit 50. Within the separator unit 50, precipitated solids are separated from the slurry $S_n$ and the remaining liquid L phase having temperature $T_2$ substantially equal to $T_{1n}$, proceeds to the last condenser unit 40n to be used as the absorber of the latent heat released by the condensing vapor $V'_n$, as previously detailed.

Along the condenser units 40n to 40a, the temperature of the liquid L to $L_a$ gradually rises from $T_2$ to $T_{2a}$, as already explained. The concentration of the liquid decreases along the condenser units 40n to 40a, due to the condensation processes taking place therewithin. Consequently, the outlet liquid $L_a$ has parameters similar to those of brine B, excluding the solids separated by separator 50. The amount of separated solids is small relative to the total amount of solutes in the slurry. Therefore, the concentration of liquid $L_a$ is only slightly lower than that of brine B fed to the system.

The system 10 described above may be used, for example, for the recovery of carnallite from the Dead Sea EB solution. The EB, having the temperature of $T_1=35°$ C. and total solutes concentration $C_1=35\%$ enters a six-stage system 10 (N=6). Along the crystallizer sub-system 20 the temperature of the EB gradually decreases so that the temperature $T_{1n}$ of the slurry $S_n$ discharged from the sixth crystallizer unit 20n is about 14° C. Each crystallizer unit, therefore, lowers the temperature of the EB by $\Delta T=3.5°$ C. The slurry $S_n$ enters the separator sub-system 50 where a small amount of solids is separated, and the remained liquid proceeds to the condenser sub-system 40. The liquid $L_a$ discharged from the first condenser unit 40a has a temperature $T_{2a}$ substantially equal to 35° C.

Table 1 summarizes, in a non-limiting manner, parameters which the systems 10 may possess, in accordance with the example described above.

| Stage number | units | 1 | 2 | 3 | 4 | 5 | 6 |
|---|---|---|---|---|---|---|---|
| Crystallizer units | | — | — | — | — | — | — |
| Temperature in | Deg C. | 35.0 | 31.5 | 28.0 | 24.5 | 21.0 | 17.5 |
| Temperature out | Deg C. | 31.5 | 28.0 | 24.5 | 21.0 | 17.5 | 14.0 |
| Flow in Water | ton/hr | 650.0 | 646.1 | 642.2 | 638.3 | 634.5 | 630.7 |
| Flow in Minerals | ton/hr | 350.0 | 350.0 | 350.0 | 350.0 | 350.0 | 350.0 |
| Total flow In | ton/hr | 1000.0 | 996.1 | 992.2 | 988.3 | 984.5 | 980.7 |
| Total water evaporated | ton/hr | 3.9 | 3.9 | 3.9 | 3.8 | 3.8 | 3.8 |
| Total flow Out | ton/hr | 996.1 | 992.2 | 988.3 | 984.5 | 980.7 | 976.9 |
| Carnalite Separated | ton/hr | | | | | | 18.2 |
| Pressure in vessel | mmHg | 14.1 | 11.5 | 9.2 | 7.4 | 5.9 | 4.7 |
| Condenser units | | | | | | | |
| Temperature in | Deg C. | 31.5 | 28.0 | 24.5 | 21.0 | 17.5 | 14.0 |
| Temperature out | Deg C. | 35.1 | 31.6 | 28.1 | 24.6 | 21.1 | 17.6 |
| Flow in Water | ton/hr | 646.1 | 642.2 | 638.3 | 634.5 | 630.7 | 626.9 |
| Flow in Minerals | ton/hr | 331.8 | 331.8 | 331.8 | 331.8 | 331.8 | 331.8 |
| Total flow In | ton/hr | 977.9 | 974.0 | 970.1 | 966.3 | 962.5 | 958.7 |
| Total water absorbed | ton/hr | 3.9 | 3.9 | 3.9 | 3.8 | 3.8 | 3.8 |
| Total flow Out | ton/hr | 981.8 | 977.9 | 974.0 | 970.1 | 966.3 | 962.5 |
| Pressure in vessel | mmHg | 18.6 | 15.0 | 12.2 | 9.8 | 7.9 | 6.3 |
| Compressor units | | | | | | | |
| Water vapor mass flow | ton/hr | 3.9 | 3.9 | 3.9 | 3.8 | 3.8 | 3.8 |
| Compressor volume capacity | m3/sec | 79.9 | 95.3 | 114.3 | 146.9 | 178.0 | 216.9 |
| Compression pressure ratio required | # | 1.3 | 1.3 | 1.3 | 1.3 | 1.3 | 1.3 |

Total carnallite produced from 1000 ton of End Brine as listed in the above example is 18.2 ton.

Being an intermediate material in the production of the final salable product Potash or KCl, the carnallite is further processed into KCl. Each ton of carnallite is processed into 0.21 tons of potash (assuming a process with 80% overall recovery). Consequently, the total amount of salable potash produced from 1000 tons of End Brine will amount to 3.9 tons of KCl.

The invention claimed is:

1. A method of separation of at least part of the solids from brine having an initial temperature T1, the method comprising: evaporating at least a part of said brine producing thereby a vapor stream having a first pressure P1 and a slurry having a second temperature T2 lower than said first temperature T1; separating said part of the solids from said slurry, producing thereby a remaining liquid having a temperature equal to T2, wherein said solids remain in a solid state; compressing said vapor thereby increasing its pressure from P1 to P2; condensing said compressed vapor by having said remaining liquid absorb a latent heat released from said compressed vapor and discharging an outlet liquid of temperature equal to T1, the method further comprising adding of secondary soluble solids to said condenser reducing thereby a compression pressure ratio P2/P1 required relative to its value without said addition.

2. The method of claim 1, further comprising evaporating said brine by means of a plurality of crystallizer units arranged in series, each crystallizer unit being adapted to lower the temperature of the brine received therewith by a corresponding temperature difference $\Delta T$, each but first crystallizer unit being adapted to receive therein a brine of a temperature lower than that received within the preceding crystallizer unit and to discharge therefrom a vapor of a pressure lower than that discharged from the preceding crystallizer unit.

3. The method of claim 2, further comprising compressing said vapor by means of a plurality of compressor units, each being in fluid communication with its corresponding crystallizer unit.

4. The method of claim 3, further comprising condensing said compressed vapor by means of a plurality of condenser units arranged in series, each condenser being in fluid communication with its corresponding compressor unit, each condenser unit being adapted to raise the temperature of the liquid received therewith by said corresponding temperature difference $\Delta T$, each but last condenser unit being adapted to receive therein a liquid of a temperature higher than that received within the preceding condenser unit and a compressed vapor of a pressure higher than that received within the preceding condenser unit, said compressed vapor being discharged from said corresponding compressor unit.

5. The method of claim 2, wherein said corresponding temperature difference $\Delta T$ is the same in all the plurality of crystallizer units.

6. The method of claim 2, wherein said corresponding temperature difference $\Delta T$ varies between said plurality of crystallizer units.

7. The method of claim 3, wherein a compression pressure ratio between a pressure of the compressed vapor discharged from each compressor unit and the pressure of a vapor received within each compressor unit is equal in said plurality of compressor units.

8. The method of claim 1, further comprising creating and maintaining vacuum in the system.

* * * * *